United States Patent [19]
Van Dine et al.

[11] Patent Number: 5,573,866
[45] Date of Patent: Nov. 12, 1996

[54] DIRECT METHANOL OXIDATION POLYMER ELECTROLYTE MEMBRANE POWER SYSTEM

[75] Inventors: Leslie L. Van Dine, Manchester; Donald L. Maricle, Glastonbury, both of Conn.

[73] Assignee: International Fuel Cells Corp., South Windsor, Conn.

[21] Appl. No.: 437,267

[22] Filed: May 8, 1995

[51] Int. Cl.$^6$ .......................... H01M 8/10; H01M 8/02; H01M 8/04
[52] U.S. Cl. ................ 429/13; 429/14; 429/40; 429/30
[58] Field of Search ................ 429/40, 188, 13, 429/14, 41, 46, 30, 33, 192

[56] References Cited

U.S. PATENT DOCUMENTS

| | | | |
|---|---|---|---|
| 3,425,873 | 2/1969 | Worsham et al. | 136/86 |
| 3,514,335 | 5/1970 | Grubb | 136/86 |
| 3,556,857 | 1/1971 | Poirier et al. | 136/86 |
| 4,040,435 | 8/1977 | Elzinga | 429/14 |

FOREIGN PATENT DOCUMENTS 101775  6/1984  Japan ................ H01M 4/90

OTHER PUBLICATIONS

Bittins–Cattaneo et al., J. Appl. Electrochem. 23 (1993)*, 625–630 1993.

*Primary Examiner*—T. Tung
*Assistant Examiner*—Alex Noguerda
*Attorney, Agent, or Firm*—William W. Jones

[57] ABSTRACT

A polymer electrolyte membrane fuel cell includes an anode chamber and a cathode chamber which are separated by the electrolyte membrane. The fuel cell directly oxidizes a liquid methanol fuel which is fed into the anode chamber from a liquid methanol storage container. The liquid methanol is mixed with water in the anode chamber, and the mixture passes into and through the electrolyte membrane. Some of the methanol and water pass through the membrane into the cathode chamber and into a process air stream which moves through the cathode chamber. The methanol and water are removed from the cathode chamber by evaporation into the process air stream, which then is directed into a condenser/radiator. The methanol and water vapors are condensed in the condenser/radiator, from whence the condensed water and methanol are returned to the anode chamber of the cell. The evaporating cathode process air stream provides oxygen for the fuel cell reaction, and also cools the cell.

15 Claims, 1 Drawing Sheet

DIRECT METHANOL OXIDATION POLYMER ELECTROLYTE MEMBRANE POWER SYSTEM

TECHNICAL FIELD

This invention relates to a solid polymer electrolyte membrane fuel cell and a stack using such cells, which utilizes direct oxidation of liquid methanol along with air to provide the fuel and oxidant necessary for the production of electricity.

BACKGROUND ART

Fuel cells using a polymer membrane such as sulfonated fluorinated polymer membrane-like materials sold under the trademark NAFION by E.I. dupont de Nemours and Co. are known in the art. Such fuel cells typically operate in a pressure range of from one atmosphere to about five atmospheres, and at relatively low temperatures, i.e., temperatures which are below the boiling point of water. The hydrogen fuel source for such fuel cells is typically natural gas which must be chemically treated, or "reformed" so as to raise the percentage of hydrogen in the fuel gas, and to remove contaminants. One problem with using gaseous fuels for solid polymer electrolyte fuel cells relates to the tendency of the membrane to dry out during operation. In order to operate efficiently, the electrolyte membrane must be kept moist. Moisture for the membrane can be derived from product water formed during operation of the fuel cell. Additional moisture for the membrane can be obtained by humidifying the reactant gases as they are being fed into the anode and cathode reaction chambers. Polymer membrane cells, while operating at relatively low temperatures as compared to other types of fuel cells, will perform most efficiently when operating in the upper end of their operating temperature range. Higher operating temperatures, however, serve to exacerbate the dry-out problem. As noted above, natural gas fuels also require refining or reforming to increase the hydrogen concentration in the fuel gas and to eliminate contaminants.

The desirability of using liquid fuels to provide the reactant for the anode side of the polymer membrane fuel cell has been noted by the prior art. The use of relatively high purity liquid fuels such as methanol, ethanol or other alcohols as a reactant for fuel cells has been recognized as being desirable in U.S. Pat. Nos. 4,390,603, granted Jun. 28, 1983; U.S. Pat. No. 4,828,941, granted May 9, 1989; and U.S. Pat. No. 5,132,193, granted Jul. 21, 1992. One problem with using liquid methanol, or other liquid alcohols, as a fuel source for a solid polymer membrane electrolyte fuel cell relates to the fact that a portion of the liquid methanol fuel will diffuse from the anode chamber through the electrolyte membrane into the cathode chamber. Once the methanol fuel enters the cathode chamber, the conventional platinum cathode catalyst will oxidize the methanol on the cathode side of the membrane thereby resulting in lower cell performance, and heat generation. The use of liquid methanol fuel thus lowers performance of the cathode, and results in a loss of the methanol fuel.

Recent developments in cathode catalysts have resulted in the identification of cathode catalysts which can be used in solid polymer electrolyte fuel cells, and which will not oxidize methanol to any significant degree. Examples of such cathode catalysts include: iron tetramethoxyphenylporphyrin; iron tetramethoxyphenylporphyrin +$RuO_2$; iron octaethylporphyrin; iron octaethylporphyrin +$RuO_2$; cobalt tetrapyridylporphyrin; cobalt tetrapyridylporphyrin +$RuO_2$; iron tetrapyridylporphyrin; iron tetrapyridylporphyrin +$RuO_2$; and iron tetranitrophenylporphyrin. Eastman Kodak Company has the ability to produce the aforesaid catalysts. It would be highly desirable to provide a liquid methanol-consuming fuel cell system which utilizes a solid polymer electrolyte membrane and which would provide for efficient consumption of the methanol fuel.

DISCLOSURE OF THE INVENTION

This invention relates to a solid polymer electrolyte fuel cell which can be used to produce relatively compact fuel cell stacks that are suitable for replacement of advanced single-use primary batteries with a power source that can be recharged as can a lead-acid storage battery. The fuel cells and stacks utilize liquid methanol as a fuel source, and ambient air as an oxidant source. The liquid methanol fuel may be stored in a flexible pouch contained in a box, and it is fed from the pouch into the anode chambers in the stack where it is mixed with water. The composition of the solution which contacts the electrolyte membrane is preferably about 96% water and 4% methanol. The fuel source solution will preferably consist of about 1% to about 10% methanol, with the remainder being water; however, the solution may include up to 65% methanol, with the remainder being water. The stack cells will use a conventional direct methanol anode catalyst such as a 50/50% mixture of platinum and ruthenium black, and will use the aforesaid cathode catalysts so as to guard against cathode oxidation of cross-over methanol in the cathode chamber. A fan will be used to blow ambient air into the cathode chamber to provide oxygen for the electrolytic reaction. The air stream will evaporate water and methanol which pass through the polymer electrolyte into the cathode chamber. The cathode side of each cell in the stack is thus cooled by evaporation. The air stream passes from the cathode chamber in each cell in the stack to a condenser/radiator, where the gas stream is cooled from a temperature of about 160° to about 190°, to a temperature of about 120° to about 140° F. The water and methanol vapors entrained in the air stream condense out of the air stream in the condenser, and are then returned to the anode chamber in each cell. The dried air stream is then removed from the stack. Active controls may be used to modulate movement of the fuel, air stream, and the recondensed water/methanol solution where needed.

It is therefore an object of this invention to provide an improved solid polymer electrolyte fuel cell and fuel cell stack which uses liquid methanol as a fuel source.

It is an additional object of this invention to provide a fuel cell and stack of the character described wherein the methanol fuel is reacted on the anode catalyst at the polymer electrolyte surface in a water/methanol solution.

It is a further object of this invention to provide a fuel cell and stack of the character described wherein cross-over methanol is not oxidized but recovered on the cathode side of the stack cells.

It is another object of this invention to provide a fuel cell and stack of the character described wherein recovered methanol and water are reused in the electrolytic reactions.

It is an additional object of this invention to provide a fuel cell and stack of the character described wherein cross-over water and methanol are evaporated in an ambient air stream to cool the stack and cells.

It is yet another object of this invention to provide a fuel cell and fuel cell stack of the character described wherein the water balance in the system is controlled by the exit temperature of the condenser, thereby allowing the stack to operate at higher temperatures so as to improve the voltage output of the power plant by thermally enhancing the rate of the electrochemical reaction.

These and other objects and advantages of this invention will become more readily apparent from the following detailed description of a preferred embodiment thereof when taken in conjunction with the accompanying drawings, in which:

BEST MODE FOR CARRYING OUT THE INVENTION

Figure 1:
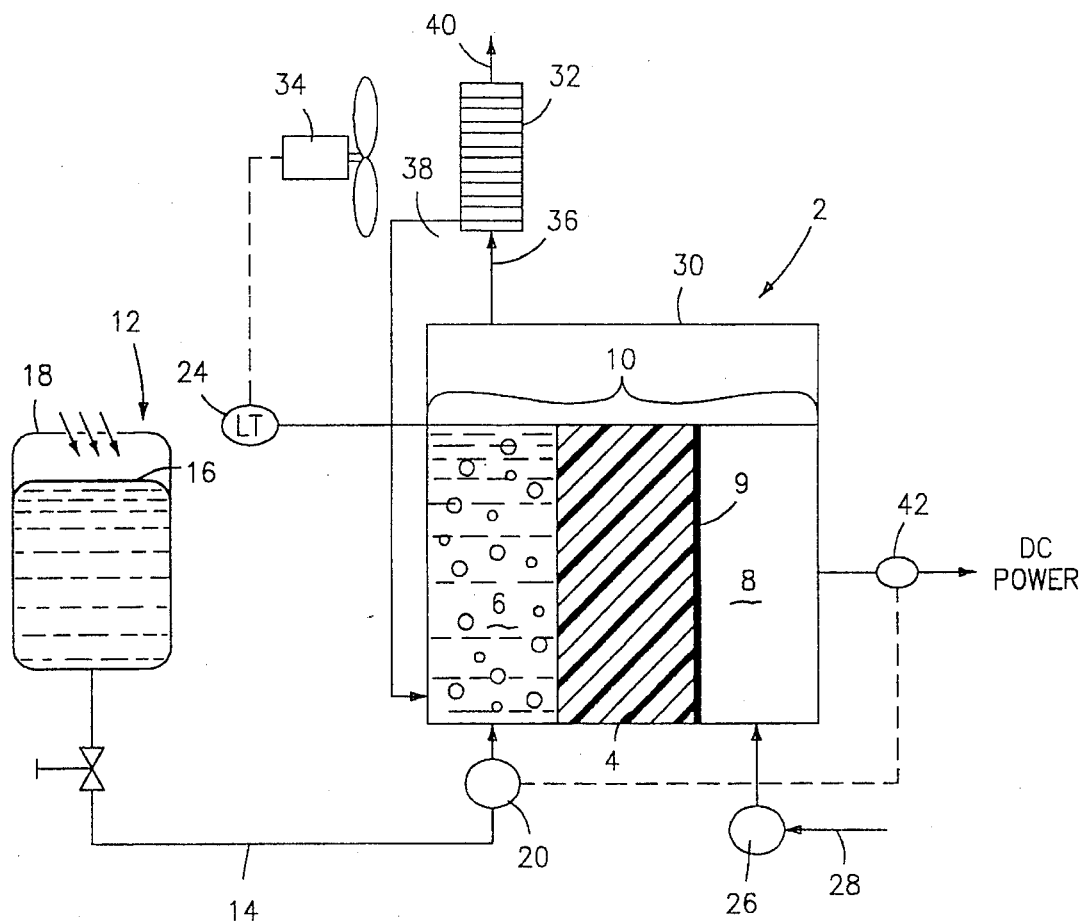
FIG. 1 is a schematic representation of a fuel cell system which is formed in accordance with this invention.

Referring now to FIG. 1, there is shown a schematic representation of a liquid methanol-air fuel cell system which is denoted generally by the numeral 2. The system-2 includes a solid polymer electrolyte component 4; an anode reactant chamber 6; and a cathode reactant chamber 8. The chambers 6 and 8 are formed by porous or channeled graphite, carbon, or metal sheets. The anode chamber 6, the solid polymer electrolyte component 4 and the cathode chamber 8 combine to form one fuel cell 10, which can be repeated in a known manner to form a fuel cell stack. The cathode catalyst layer 9 is disposed on the cathode chamber side of the electrolyte membrane 4.

As previously noted, the fuel cell 10 of this invention utilizes methanol as its source of fuel for the electrochemical reaction needed to produce electricity. Essentially pure methanol liquid fuel is stored in a storage tank 12 which is selectively fed into the anode chamber 6 through a conduit 14. The storage tank 12 may consist of a flexible bladder 16 disposed in a rigid container 18, which bladder 16 collapses in the container 18 as methanol is withdrawn therefrom. The transfer of methanol from the tank 12 to the anode chamber 6 can be either gravity-induced, or can be mechanically induced by means of a metering pump 20. It will be understood that prior to start up, the anode chamber 6 will be filled with a mixture of methanol in water, the mixture being about 96% water and about 4% methanol. An anode chamber liquid level sensor 24 which monitors the level of the water-methanol mixture in the anode chamber 6 is included in the system.

A fan 26 is mounted in a passage 28 and draws ambient air into the cathode chamber 8 so as to cool the latter. The cooling air stream exits from the cathode chamber 8 through a common manifold 30 which serves both the anode and cathode sides of the cell 10. The cooling air stream evaporates any cross-over water, methanol and product water, thus cooling the cathode side of the cell 10 and preventing flooding of the cathode catalyst layer 9. The humidified air stream exiting the cathode chamber 8 through the manifold 30 passes into a condenser 32 where the methanol and water content of the cathode effluent air stream is condensed out of the air stream. Cooling air for the condenser 32 is supplied by a fan 34 which selectively directs a stream of ambient cooling air across the condenser 32. The line 36 ducts water, carbon dioxide, and methanol which may evaporate from the anode chamber 6 into the condenser 32. Condensed water and methanol are drained from the condenser 32 back into the anode chamber 6 via drain line 38. The exhaust from the condenser 32, which consists of a mixture of carbon dioxide, product water vapor, and minor amounts of methanol is vented from the condenser 32 through a line 40. The methanol metering fuel pump 20 can be selectively operated and controlled by a solenoid 42 activated when the electric load is applied. Likewise, the condenser fan 34 can be selectively turned off and on by the anode water-methanol level sensor 24 which activates a fan-on switch when the liquid level rises.

Figure 2:
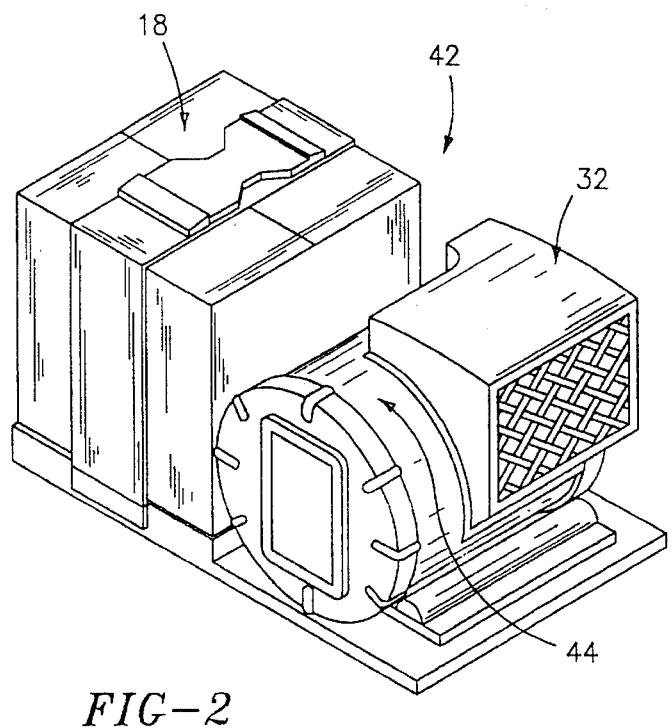
FIG. 2 is a perspective view of a portable fuel cell stack assembly formed in accordance with this invention which can be used to replace a high energy density lithium battery.

As seen in FIG. 2, a compact fuel cell stack assembly 42 can be constructed using the cells shown in FIG. 1. The assembly 42 will include a small condenser unit 32, a methanol fuel tank 18, and a stack 44 which may typically be formed from twenty of the cells shown in FIG. 1. Such a unit can be operated in a 160° to 1700° F. temperature range at ambient pressures to produce 300 watts of net dc power. The unit is relatively light in weight, i.e., about eleven pounds, and sufficiently compact in size to be used as a replacement for conventional lithium primary batteries. Larger versions of the system could thus be used in vehicles, boats, lawn mowers, or the like, or essentially anywhere that a portable source of dc power is needed.

The cell plate components are relatively conventional carbon plates that have been formed-with transverse grooves to contain the water and methanol mixture on the anode side and to allow passage of the cooling air stream on the cathode side. The electrolyte may be conventional Nafion® film, and the cathode catalyst will be a catalyst, such as identified above, which does not oxidize methanol. The use of a water-methanol fuel mixture and a cathode catalyst which does not oxidize cross-over methanol, allows the cell and stack to be operated at relatively high temperatures which promote efficient fuel utilization, and which allows cross-over methanol to be recovered and reused. Cooling of the stack is accomplished without the need of a separate stack cooling loop. The use of the water-methanol mixture, and the resultant water cross-over, as well as the expression and evaporation of product water on the cathode side allows the stack to be operated at higher temperatures without risking electrolyte dryout.

Since many changes and variations of the disclosed invention may be made without departing from the inventive concept, it is not intended to limit the invention otherwise than as required by the appended claims.

What is claimed is:

1. A fuel cell power plant assembly which is adapted for utilizing liquid methanol as a fuel source, said assembly comprising:

a) a solid polymer electrolyte membrane;

b) an anode reactant chamber disposed on one side of said electrolyte membrane;

c) a cathode reactant chamber disposed on a side of said electrolyte membrane opposite to said anode reactant chamber;

d) a water-methanol solution disposed in said anode chamber;

e) a cathode catalyst disposed in said cathode reactant chamber, said cathode catalyst being formed from a catalytic composition which does not significantly oxidize methanol that enters said cathode reactant chamber from said anode reactant chamber by diffusion through said electrolyte membrane;

f) a source of oxygen disposed in said cathode chamber, wherein said source of oxygen is a stream of air which flows through said cathods reactant chamber and sweeps product water and diffused water and methanol out of said cathode reactant chamber to cool the latter; and g) a condenser for receiving an effluent stream of humidified air from said cathode reactant chamber, said condenser being operable to condense liquid water and liquid methanol from said effluent cathode reactant chamber air stream.

2. The fuel cell power plant assembly of claim 1 further comprising a return line from said condenser to said anode chamber, said return line being operable to transfer condensed water and methanol from said condenser to said anode reactant chamber for recycling said condensed water and methanol through the power plant.

3. The fuel cell power plant assembly of claim 2 further comprising a supply of liquid methanol, and methanol delivery means for selectively delivering liquid methanol from said supply thereof to said anode reactant chamber.

4. The fuel cell power plant assembly of claim 3 wherein said supply of liquid methanol comprises a tank containing the liquid methanol, and means for pressurizing the liquid methanol in said tank.

5. The fuel cell power plant assembly of claim 4 further comprising a metering pump in said methanol delivery means for assisting movement of the liquid methanol from said tank to said anode reactant chamber.

6. The fuel cell power plant assembly of claim 7 further comprising means for sensing the level of the water-methanol solution in said anode reactant chamber.

7. The fuel cell power plant assembly of claim 8 further comprising means for selectively enhancing cooling in said condenser, and operatively connected to said means for sensing, so as to increase the amount of water and methanol condensed out of said effluent stream of humidified air when a target level of the water-methanol solution is sensed in said anode reactant chamber.

8. A method of operating a solid polymer fuel cell power plant with a liquid methanol fuel source, said method comprising the steps of:

a) providing a solid polymer electrolyte membrane in said power plant;

b) providing a supply of a water-methanol solution in an anode reactant chamber disposed on one side of said electrolyte membrane;

c) providing a cathode catalyst in a cathode reactant chamber disposed on a side of said electrolyte membrane opposite said anode reactant chamber, said cathode catalyst being formed from a catalytic composition which does not significantly oxidize liquid methanol which diffuses from said anode reactant chamber to said cathode reactant chamber through said electrolyte membrane;

d) allowing liquid methanol to diffuse through said electrolyte membrane during operation of the power plant;

e) directing a stream of air through said cathode reactant chamber to provide oxygen to produce electricity in the power plant, and to provide a gaseous stream which will sweep product water and diffused water and methanol out of said cathode reactant chamber to cool the latter; and f) providing a condenser for receiving an effluent stream of humidified air from said cathode reactant chamber, said condenser being operable to condense liquid water and liquid methanol from said effluent cathode reactant chamber air stream.

9. The method of claim 8 further comprising the step of providing a return line from said condenser to said anode chamber, said return line being operable to transfer condensed water and methanol from said condenser to said anode reactant chamber for recycling said condensed water and methanol through the power plant.

10. The method of claim 9 further comprising the step of selectively delivering liquid methanol from said supply thereof to said anode reactant chamber.

11. The method of claim 10 further comprising the step of containing the liquid methanol in a tank.

12. The method of claim 11 further comprising the step of assisting movement of the liquid methanol from said tank to said anode reactant chamber.

13. The method of claim 12 further comprising the step of sensing the level of the water-methanol solution in said anode reactant chamber.

14. The method of claim 13 further comprising the step of selectively cooling said condenser to increase the amount of water condensed out of said effluent stream of humidified air upon sensing a target level of water-methanol in said anode reactant chamber.

15. A fuel cell power plant assembly which is adapted for utilizing liquid methanol as a fuel source, said assembly comprising:

a) a solid polymer electrolyte membrane;

b) an anode reactant chamber disposed on one side of said electrolyte membrane;

c) a cathode reactant chamber disposed on a side of said electrolyte membrane opposite to said anode reactant chamber;

d) a water-methanol solution disposed in said anode chamber;

e) a cathode catalyst disposed in said cathode reactant chamber, said cathode catalyst being formed from a catalytic composition which does not significantly oxidize methanol that enters said cathode reactant chamber from said anode reactant chamber by diffusion through said electrolyte membrane;

f) means for producing a stream of air which flows through said cathode reactant chamber and sweeps product water and diffused water and methanol out of said cathode reactant chamber to cool the latter;

g) a condenser for receiving an effluent stream of humidified air from said cathode reactant chamber, said condenser being operable to condense liquid water and liquid methanol from said effluent stream; and h) a return line from said condenser to said anode chamber, said return line being operable to transfer condensed water and methanol from said condenser to said anode reactant chamber for recycling said condensed water and methanol through the power plant.

* * * * *